No. 794,243. Patented July 11, 1905.

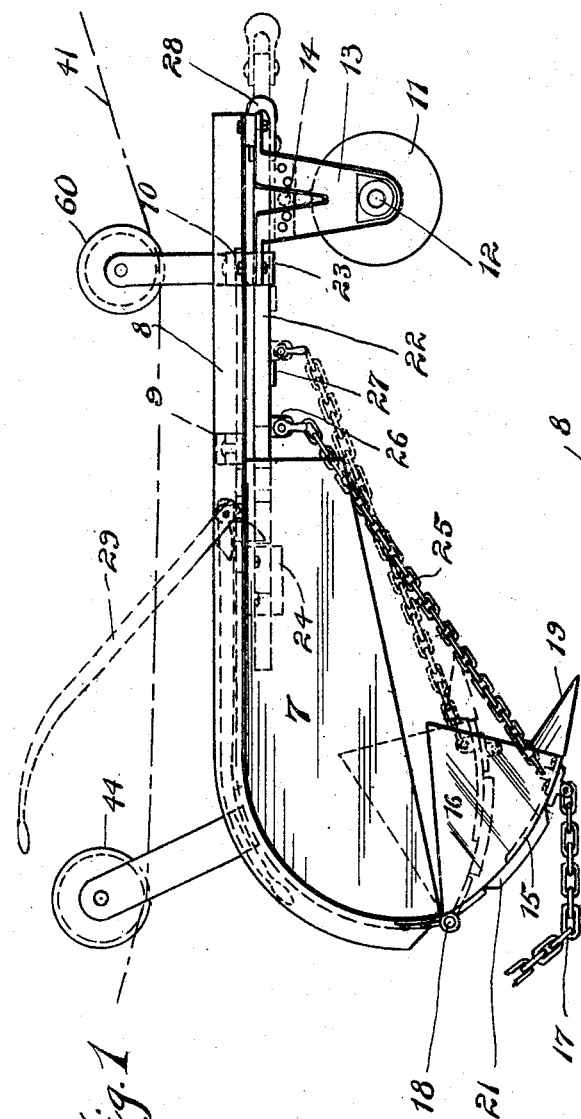

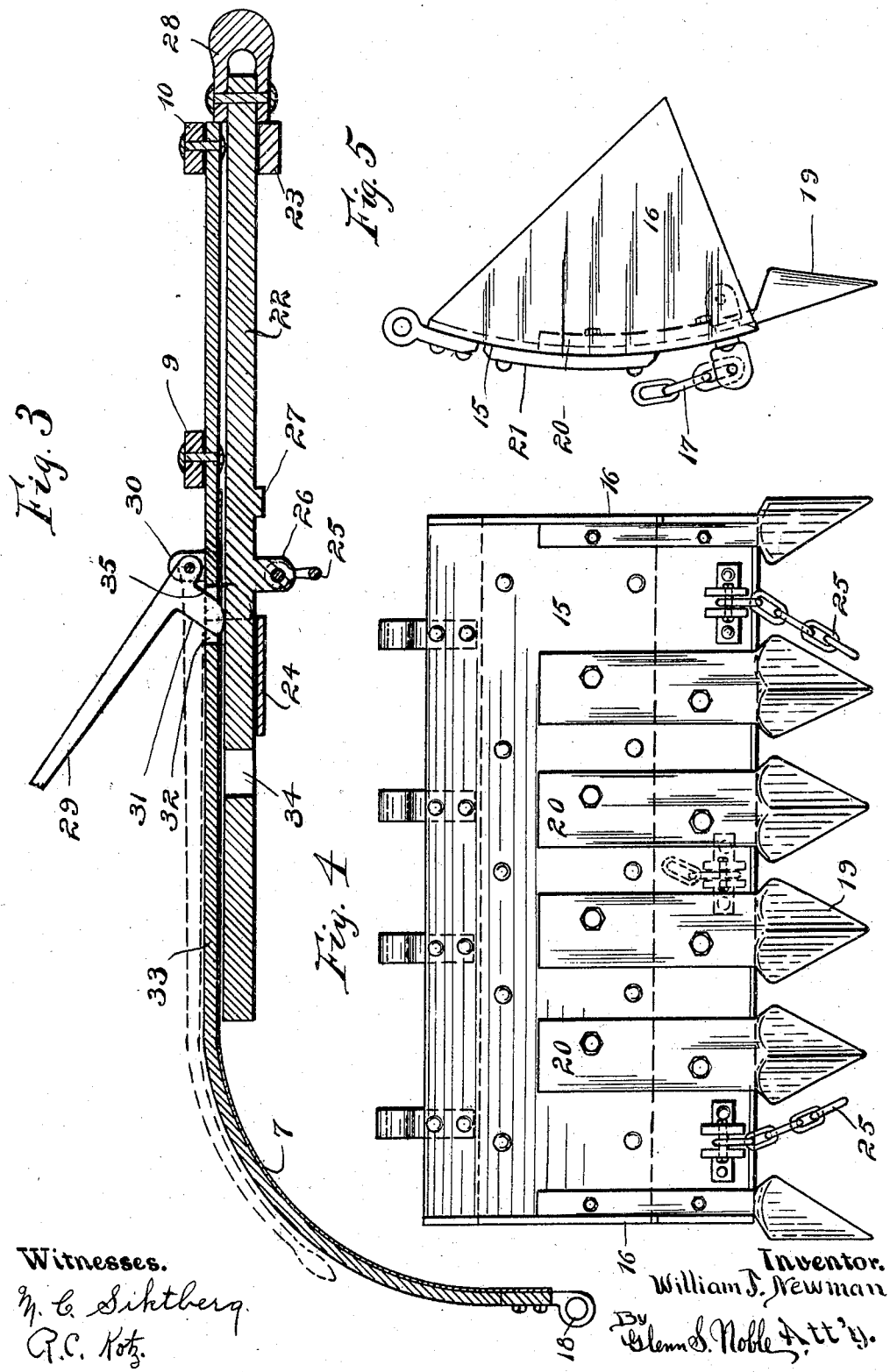

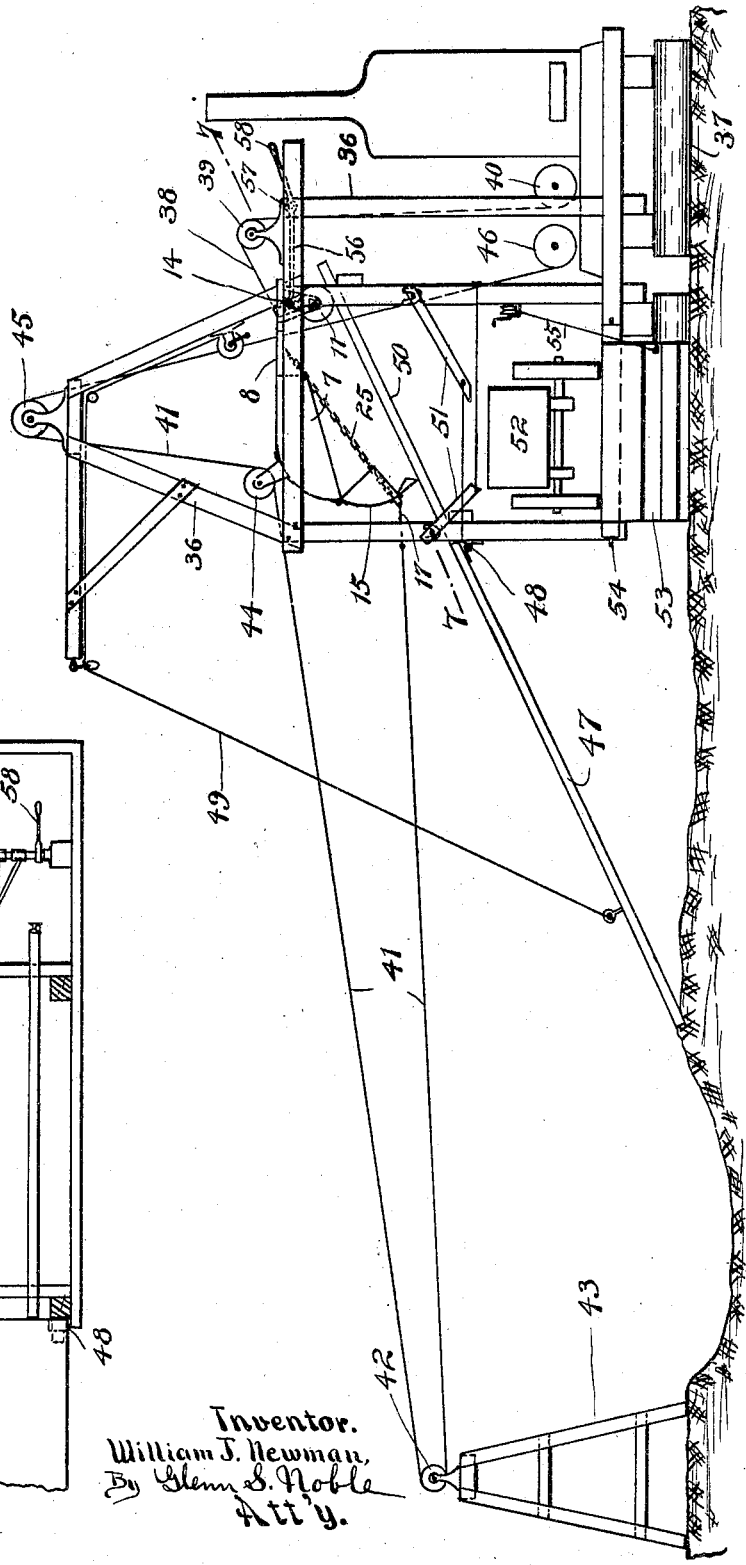

UNITED STATES PATENT OFFICE.

WILLIAM J. NEWMAN, OF CHICAGO, ILLINOIS.

EXCAVATING APPARATUS.

SPECIFICATION forming part of Letters Patent No. 794,243, dated July 11, 1905.

Application filed November 21, 1904. Serial No. 233,643.

*To all whom it may concern:*

Be it known that I, WILLIAM J. NEWMAN, a citizen of the United States, residing at Chicago, in the State of Illinois, have invented certain new and useful Improvements in Excavating Apparatus, of which the following is a specification.

This invention relates to an apparatus which is adapted for excavating and loading various materials and also for grading or smoothing off irregular piles of earth, clay, or the like.

It comprises a novel excavating device or shovel, together with suitable operating mechanism, discharging apparatus, and the like, which will be fully described and claimed hereinafter.

In the accompanying drawings, Figure 1 represents a side elevation of an excavating device embodying a part of this invention. Fig. 2 is a top plan view of the same. Fig. 3 is a longitudinal sectional view through the upper or receiving portion of the excavating device. Fig. 4 is a top plan view of the shovel. Fig. 5 is an end view of the same. Fig. 6 is a side elevation, partly diagrammatical, showing the entire excavating apparatus as arranged for operation; and Fig. 7 is a plan view on line 7 7 of Fig. 6.

The excavating device or shovel will for convenience be described first and then its operation described in connection with the operating and discharging apparatus. This device consists of an inverted scoop or receptacle 7, which is firmly bound and braced by frame-beams 8, which extend somewhat beyond the front end of the scoop. These beams are connected at the forward end by means of cross-pieces 9 and 10 and are supported on a roller 11, which has its axle 12 in depending brackets 13 on the beams 8. These brackets are further stiffened by a cross-rod 14, which also serves for holding the shovel when being discharged, as will be described hereinafter. The excavating or digging part proper consists of a curved plate 15, which is provided with side pieces or wings 16 and is hinged to the scoop 7, as shown at 18. This plate or shovel carries a plurality of forwardly-projecting triangular teeth or plows 19, which are securely fastened thereto by means of the shanks 20, as shown in Figs. 4 and 5. These teeth are intended for the purpose of loosening the material, so that it may be gathered up by the shovel 15, the forward edge of the latter being preferably somewhat sharpened. In order that the material will be divided by these teeth, the upper edges are sufficiently sharpened to cut through it. The two outer teeth preferably consist of half-sections of the main teeth and are extended somewhat beyond the sides of the shovel in order to cut a sufficiently wide excavation, so that all of the upper part of the device may pass down between the side walls left in excavating.

The shovel 15 may be caused to assume a digging position, as shown in full in Fig. 1, or a carrying or closed position, as shown in dotted lines in said figure, or a discharging position, in which it is swung farther back from the digging position, as shown in Fig. 6. The back of the shovel is provided with a shoe 21, upon which it rests or slides when in the closed position. The position is regulated by means of the sliding bar 22, which is held in bearings 23 and 24 on the main frame part of the device. Chains 25 connect between the shovel 15 and a suitable lug 26 on said bar. It is evident that as the bar 22 is drawn forward it will cause the shovel 15 to be drawn up, as shown in dotted lines, or if moved backward will allow the shovel to swing open for discharging. The forward movement of the bar 22 is determined by a lug 27, which engages with the bearing 23 when the shovel has reached the desired position for closing. The backward movement is determined by the clevis 28, striking the same bearing when the shovel has reached its open position. In order to hold the bar 22 for the shovel in digging position, I have provided a locking-lever 29, which is pivoted between lugs 30 on the top of the scoop 7 and is provided with a locking-dog 31, which is adapted to extend down through a slot 32 in a stiffening-bar 33 along the top of the scoop and engage with a slot 34 in the bar 22. This dog is shouldered at 35 to engage with the bar 33 in order to take the strain off from the pivot-pin and is slightly curved at the lower corner, so that it will be thrown up out of engaging position when the bar 22 is pressed backward. When the bar 22 is drawn forward, the weight of the lever 29 throws the dog 31 automatically into engagement with the slot 34 and prevents a further relative movement of the bar 22, and consequently the chains 25 hold the shovel in digging position.

The operation of the digging device will be best understood when taken in connection with the operating mechanism shown in Figs. 6 and 7. A suitable framework 36, which is preferably mounted on rollers 37, carries the operating-engines, discharge apparatus, and the like. A forward or pulling cable 38 is attached to the clevis 28 on the bar 22 of the digging device and passes over a sheave 39 down to the winding-drum 40. A rear or tail cable 41 is secured by means of a chain 17 to the lower bottom side of the shovel 15 and passes back over a sheave 42 on a tower or framework 43 at any desired distance from the main frame 36. From this sheave it passes under a second sheave 44, which is rigidly secured to the rear part of the scoop 7 and from there up and over a sheave 45 at the top of the frame 36 and then down to a winding-drum 46.

A slideway 47 is hinged to the main frame at 48, and its outer end is adapted to rest upon the ground when the apparatus is in operation. This slideway may be raised by means of a rope or the like 49 and held in elevated position when it is desired to move the main frame 36. The excavating device travels up this slideway onto a set of rails 50 immediately over the discharge chute or hopper 51, which is adapted to direct the material into wagons 52. Runways 53 are provided for the wagons 52 and are pivoted at 54 to the main frame in order that they may be raised by means of ropes 55 when the apparatus is to be moved.

When the digging device reaches its discharge position, as shown in Fig. 6, a pair of hooks 56, mounted on a shaft 57 on the main frame, automatically engage with the cross rod or shaft 14 at the front end of said device. These hooks prevent a backward movement of the excavator, so that if the cable 41 is tightened the rear end of the excavator will be raised and the shovel 15 drawn to a discharging position, as shown in Fig. 6. The material will then fall between the rails 50 and be directed into the wagons 52. As soon as the material is discharged the hooks 56 are released by the operator by means of a lever 58 on the shaft 57, when a further winding of the cable 41 will draw the excavator 43 back to a position adjacent to the tower 43, when it is again ready for another load. The cable 38, which in the meantime has been allowed to unwind, is again wound up, and the pull on the bar 22 causes the shovel 15 to be thrown forward to its digging position. As soon as it has loosened and gathered a load the lever 29 is raised and allows the bar 22 to slide forward and draw the shovel 15 to its closed position, as shown in dotted lines in Fig. 1, and while in this position the excavator is drawn up to the dumping position. It will also be noted that material may be gathered from any point between the main frame and the tower and discharged at any point without using the wagon-loading mechanism. Such a use frequently occurs in excavating ditches or in smoothing off irregular surfaces.

When the device is used for smoothing off irregular surfaces or for forming a spoil-bank or the like, it is frequently desirable to have the forward end of the device raised prior to the rearward movement when discharging in order that the roller 11 will not drag back any material. For this purpose a second sheave 60 is secured to the top of the frame, as shown in Fig. 1, and the cable 41 is passed thereunder when the device is being used for the purposes last named. This second sheave is preferably mounted somewhat closer to the frame than the sheave 44.

It will readily be seen that after the device has been drawn forward to a position for dumping directly onto the ground the cable 41 may be wound up, and this will cause the front end of the digging device to be raised before the backward movement of the device begins.

It will be understood that while the above description and drawings disclose a preferred form of my invention other forms will readily suggest themselves as coming within the scope thereof, which is to be considered, broadly, as a new system or apparatus for excavating and conveying materials, and I do not wish to limit myself to a particular apparatus set forth; but

What I claim, and desire to secure by Letters Patent, is—

1. An excavating device comprising a suitably-mounted inverted scoop or receptacle, and a shovel under said scoop which is adapted to loosen and gather the material into said scoop.

2. An excavating device comprising a suitably-mounted inverted scoop or receptacle, a digging-shovel pivotally mounted beneath one end of said scoop, and means for adjusting said shovel to different positions.

3. The combination with an inverted receptacle, a shovel pivotally mounted under said receptacle, plows on said shovel, and means for adjusting said shovel to different positions relative to said scoop.

4. The combination of a framework, a roller for supporting one end of said framework, an inverted receptacle secured to the opposite end of said framework, a digging-shovel hinged at one end of said receptacle, a slidable bar mounted in said frame, means for securing a pulling-cable to said bar, a chain or equivalent device from said bar to said shovel, stops on said bar, and means for holding said bar in a predetermined position, the arrangement being such, that when the bar is in its rearmost position, the shovel will be open for discharging, when in a predetermined central position, the shovel will be in position for digging and when in its forward position, the shovel will be closed for transporting the load.

5. The combination in an excavating device, of a suitable framework upon which the shovel is hinged, a sliding bar in said framework for regulating the position of the shovel, stops on said bar adapted to engage with the bearings on said framework, a lever pivoted to said framework, and a dog on said lever adapted to engage with a slot in said framework and in said bar whereby the bar will be locked in adjusted position.

6. In an excavating device, the combination of a suitable framework, a roller for supporting one end of said framework, an inverted receptacle secured in the opposite end of said framework, a digging-shovel pivotally mounted to the lower rear end of said receptacle, a plurality of teeth on said shovel having the end teeth extending somewhat beyond the entire width of said receptacle and shovel, a shoe on said shovel, a rear opening-chain for said shovel, bearings in said framework, a slidable bar secured in said bearings, a pulling-cable secured to the front end of said bar, chains from said bar to said shovel, a lever pivoted on said framework, and a dog on said lever adapted to extend through a slot in one of said frame members, and a slot in said slidable bar to lock the latter in position to hold the shovel for digging.

7. An excavating apparatus comprising a framework for the operating mechanism, a tower or sheave support at a distance from said framework, an excavating device having a shovel with plow-teeth thereon, adapted to dig the material and then be closed for transporting material and again opened for discharge, said excavating device being adapted to operate between said tower and said framework and suitable cables and operating mechanism for drawing said excavating device forward and backward between said framework and said tower, substantially as described.

8. In an excavating apparatus, the combination of a framework for the operating mechanism, a tower at a distance from said framework, an excavating device, which is adapted to dig the material and then be closed for transporting material and again opened for discharge, a cable leading from the forward end of said excavating device over a suitable sheave in said framework to a winding-drum, a second cable leading from the rear part of the digging-shovel around a sheave mounted in said tower, then back and under a sheave mounted on said digging device, and then up and over a sheave mounted in said framework and down to a second winding-drum, substantially as described.

9. In an excavating apparatus, the combination with a digging device provided with a downwardly-swinging shovel, and with a cross-rod at the end of said device, of hooks adapted to engage with said cross-rod to hold said device while being discharged, means for raising the rear end of said device and swinging said shovel open for discharging, and means for releasing said hooks when the device is empty.

10. In an excavating apparatus, the combination of a movable frame, a driveway through said frame for wagons, a discharge-hopper in said driveway, rails arranged over said discharge-hopper, a pivoted slideway leading from the ground to direct an excavating-shovel onto said rails, means for raising said slideway when the frame is to be moved, pivoted runways for said wagons, and means for raising said runways, substantially as described.

11. In an excavating apparatus, the combination of a frame for the operating and discharge mechanism, a discharge-hopper in said frame, a slideway leading to said discharge-hopper, an excavating and conveying device, a cable leading from the front end of said excavating device around a sheave in said framework to a winding-drum, a sheave mounted at a distance from said framework, a cable leading from a digging and closing shovel of said excavating device around said sheave, and back to a sheave on said excavating device, then up and over a sheave mounted in said frame, and to a second winding-drum, and means for holding said excavating device in discharge position, whereby a tightening of said last-named cable will raise the rear end of said excavating device and open the shovel to allow for discharging, substantially as described.

12. In a device of the character set forth, the combination with a digging device, of forward and back sheaves mounted on said device, said forward sheave being somewhat closer to the frame whereby the front end of the device will be raised by the rear or tail cable passing under said sheaves when the device is being discharged.

13. The combination with an excavating and carrying shovel, of sheaves secured to said shovel, a forward cable, a rear or tail cable passing under said sheaves and secured to the rear of said shovel, substantially as described.

WILLIAM J. NEWMAN.

Witnesses:
AL. CLIF. BEAN,
M. C. SIKTBERG.